(12) United States Patent
Hashimoto

(10) Patent No.: US 6,793,126 B2
(45) Date of Patent: *Sep. 21, 2004

(54) SYSTEM AND METHOD FOR CHARGING USING DATA CARRIER

(75) Inventor: Ken Hashimoto, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,370

(22) Filed: Feb. 10, 1998

(65) Prior Publication Data

US 2001/0013539 A1 Aug. 16, 2001

(30) Foreign Application Priority Data

Oct. 16, 1997 (JP) .............................................. 9-284121

(51) Int. Cl.⁷ .............................................. G06F 17/00
(52) U.S. Cl. ..................................... 235/375; 235/378
(58) Field of Search ................................ 235/375, 378, 235/381, 385, 487; 705/1, 15, 17, 16

(56) References Cited

U.S. PATENT DOCUMENTS

| | | | | |
|---|---|---|---|---|
| 3,836,755 A | * | 9/1974 | Ehrat | 235/383 |
| 4,180,206 A | * | 12/1979 | Takahashi et al. | 235/419 |
| 5,267,173 A | * | 11/1993 | Tanizawa et al. | 235/375 |
| 5,478,989 A | * | 12/1995 | Sheley | 235/375 |
| 5,521,371 A | * | 5/1996 | Hotta et al. | 235/380 |
| 5,522,509 A | * | 6/1996 | Shimamura et al. | 209/3.3 |
| 5,610,595 A | * | 3/1997 | Garrabrant et al. | 340/825.52 |
| 5,637,847 A | * | 6/1997 | Watanabe | 235/383 |
| 5,729,697 A | * | 3/1998 | Schkolnick et al. | 235/383 |
| 5,875,434 A | * | 2/1999 | Matsuoka et al. | 705/28 |
| 5,920,844 A | * | 7/1999 | Hotta et al. | 235/380 |
| 6,010,074 A | * | 1/2000 | Kelly et al. | 235/492 |
| 6,044,990 A | * | 4/2000 | Palmeri | 211/189 |
| 6,046,676 A | * | 4/2000 | Ward et al. | 340/572.1 |
| 6,101,375 A | * | 8/2000 | Tuttle et al. | 455/127 |
| 6,177,858 B1 | * | 1/2001 | Raimbault et al. | 340/10.1 |
| 6,290,138 B1 | * | 9/2001 | Ohno et al. | 235/492 |

FOREIGN PATENT DOCUMENTS

| | | |
|---|---|---|
| JP | 60-124779 | 7/1985 |
| JP | 60-124780 | 7/1985 |
| JP | 5-334563 | 12/1993 |
| JP | 8-22514 | 1/1996 |
| JP | 8-115475 | 5/1996 |

* cited by examiner

*Primary Examiner*—Daniel St. Cyr
(74) *Attorney, Agent, or Firm*—Staas & Halsey LLP

(57) ABSTRACT

A data carrier which can be read from and written to in a non-contact state is embedded in the bottom of tableware, and in which data such as price, etc. are written. When a customer selects dishes or drinks and places the dishes or drinks on a tray, all the data are simultaneously read from the data carriers on the tray, and the total amount of charge is calculated.

24 Claims, 19 Drawing Sheets

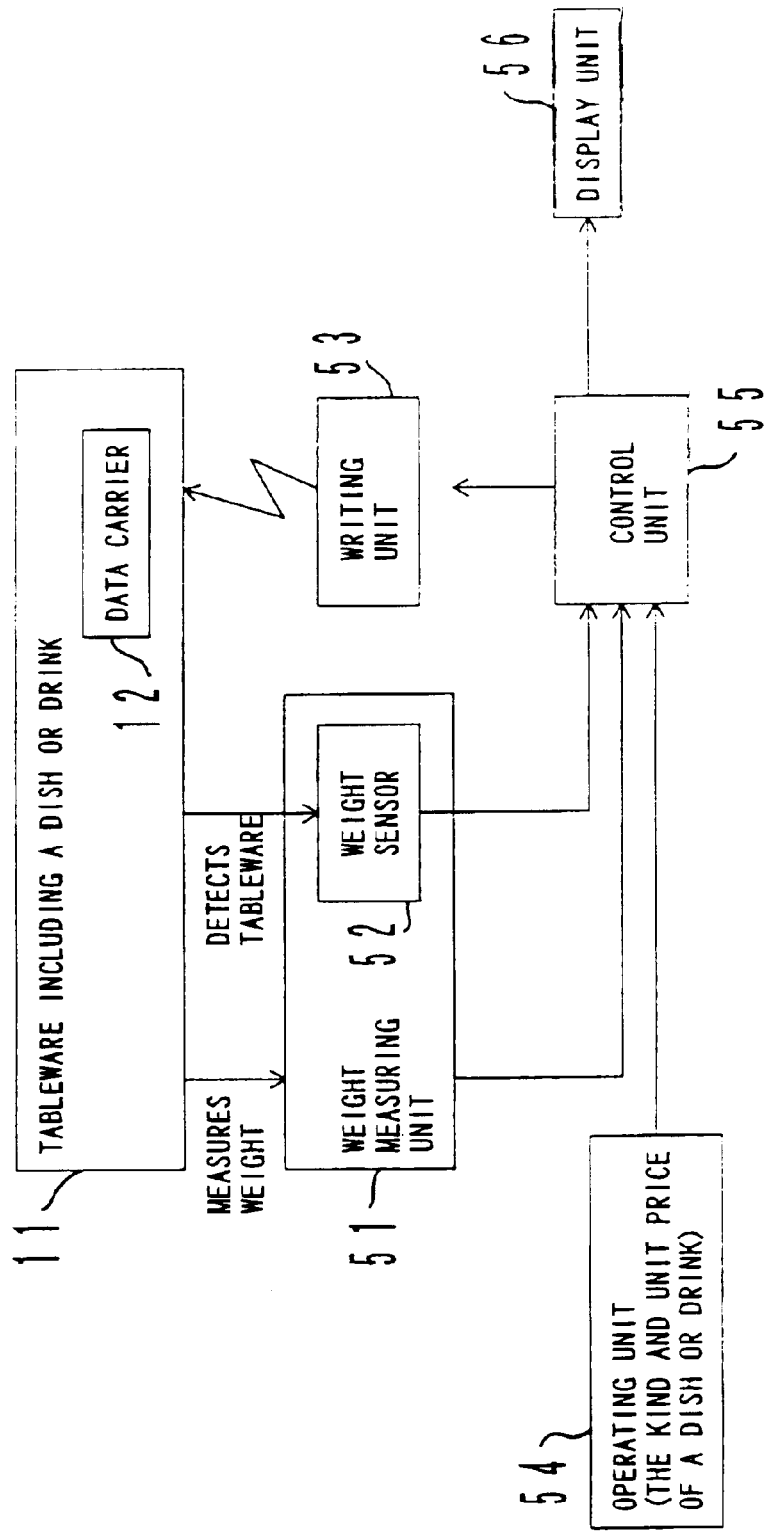
F I G. 1 2

… (US 6,793,126 B2)

SYSTEM AND METHOD FOR CHARGING USING DATA CARRIER

BACKGROUND OF THE INVENTION

1. Field of the Invention

The present invention relates to a system and method for automatically calculating the charge for a plurality of dishes selected by customers in cafeterias, restaurants etc. using a data carrier.

2. Description of the Related Art

In self-service cafeterias such as in-company cafeterias, etc. customers are often charged collectively by a customer carrying selected dishes and drinks on a tray along a predetermined course. As a conventional system for efficiently charging in cafeterias like these, an information processing system for cafeterias (Japanese Laid-open Patent Publication Nos. 60-124779 and 60-124780) is publicly known.

In this information processing system for cafeterias, the shape of a tray and tableware are recognized by photographing dishes and drinks placed on a tray and processing acquired images. The kind of dishes and drinks is judged and charged according to the size of tray, size of tableware, marks attached to the bottom of tableware, etc.

However, since when charging is made according to the size of tableware, all dishes and drinks placed in the same tableware are charged the same, and one piece of tableware cannot be used for dishes or drinks of different prices. Even if different marks on the bottom of tableware are used for a plurality of dishes, prices cannot be flexibly set depending on the volume of a dish or drink. Furthermore, if two or more pieces of tableware are placed overlapping on a tray, the shape of the tableware cannot be accurately recognized.

SUMMARY OF THE INVENTION

It is an object of the present invention to provide a charging system and method for flexibly setting the prices of many kinds of dishes and drinks provided in a cafeteria, etc. and easily calculating the charge for the dishes and drinks selected by a customer.

The charging system of the present invention comprises a writing unit, a reading unit and a calculating unit, and automatically calculates the charge for the dishes and drinks selected by a customer.

The writing unit writes data in a data carrier attached to tableware, the reading unit reads data from the data carriers of one or more dishes and drinks selected by a customer in a non-contact state. The calculating unit calculates and displays the charge for the above-mentioned one or more dishes using the read data.

For a data carrier, for example, a device for storing data using an electronic element and communicating data with a reader/writer in a non-contact state is used. This data carrier is attached to the bottom of a container (an item of tableware), etc.

The writing unit, for example, including a reader/writer, writes data on the kind, price, etc. of dishes and drinks in the data carrier in a non-contact state. A customer selects favorite dishes and drinks, places the dishes and drinks in their containers on a tray, and carries the tray to the reading unit. The reading unit, for example, including a reader/writer, reads data in a non-contact state from the data carrier of each of containers presented.

The calculating unit calculates and displays the total price of all selected dishes and drinks using the read data such as kind, price, etc. The customer can pay for the displayed charge in an arbitrary method such as in cash, with a pre-paid card, etc.

BRIEF DESCRIPTION OF THE DRAWINGS

FIG. 12 shows the configuration of a second data carrier writing device;

DESCRIPTION OF THE PREFERRED EMBODIMENT

The detailed preferred embodiments of the present invention are described below with reference to the drawings.

Figure 1:
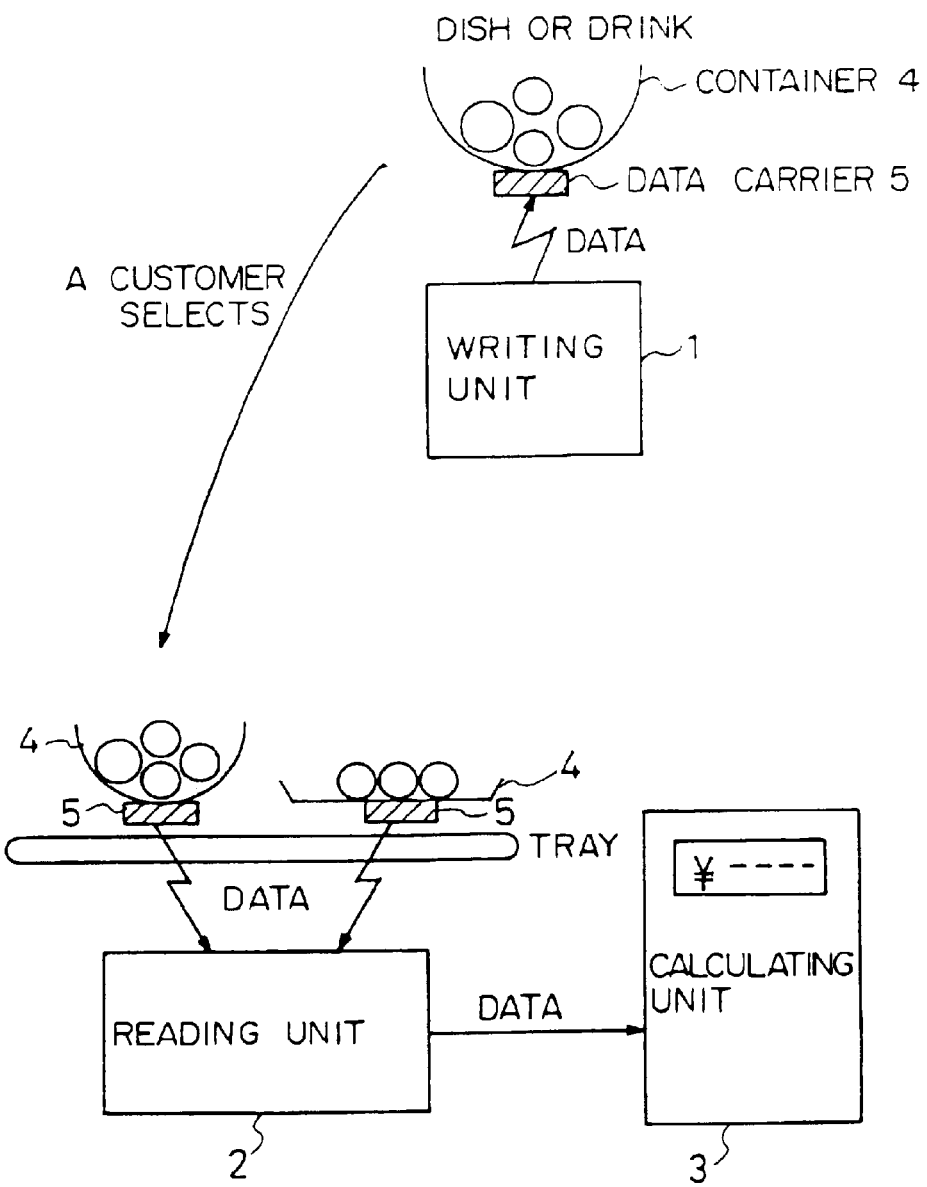
FIG. 1 illustrates a principle of the charging system of the present invention.

FIG. 1 explains the principle of the charging system of the present invention. The charging system shown in FIG. 1 comprises a writing unit 1, a reading unit 2 and a calculating unit 3, and automatically calculates the charge for the dishes and drinks selected by a customer.

The writing unit 1 writes data in a data carrier 5 attached to a container of a dish or drink, and the reading unit 2 reads data in a non-contact state from the data carrier 5 of one or more dishes and drinks selected by a customer. The calculating unit 3 calculates and displays the charge for the above-mentioned one or more dishes and drinks using the read data.

For the data carrier 5, for example, a device for storing data using an electronic element and communicating data in a non-contact state with a reader/writer is used. This data carrier 5 is attached to the bottom of a container (tableware) 4, etc.

The writing unit 1, for example, including a reader/writer, writes data on the kind, price, etc. of dishes and drinks in the data carrier 5. A customer selects favorite dishes and drinks, places the dishes and drinks in their containers 4 together on a tray, and carries the dishes and drinks to the reading unit 2. The reading unit 2, for example, also including a reader/writer, reads data in a non-contact state from the data carriers 5 of each of the presented containers 4.

The calculating unit 3 calculates and displays the total price of all selected dishes and drinks using the read data such as kind, price, etc. The customer can pay for the displayed charge in an arbitrary method such as in cash, with a pre-paid card, etc.

In this way, by storing data such as price, etc. for each dish or drink using a data carrier which data are written in and read from in a non-contact state, a plurality of dishes and drinks can be collectively charged.

If a re-writable data carrier is used, data can be changed every time the combination of dishes/drinks and containers is changed, and thereby dishes and drinks with different prices can be served in one kind of container. Depending on the volume of a dish or drink, data can also be changed. Furthermore, since there is no need to recognize the shape of a container, if containers are placed overlapping on a tray, the total charge can still be accurately calculated.

For example, the writing unit 1 shown in FIG. 1 corresponds to the data carrier writing device 14 shown in FIG. 3, described later, and both reading unit 2 and calculating unit 3 correspond to the automatic charging apparatus 15 shown in FIG. 3.

In this embodiment a data carrier for storing data such as price, etc. is attached to the bottom of tableware containing dishes and drinks, and by collectively reading the data of a plurality of items of tableware placed on a tray, the total charge is automatically calculated.

For such a data carrier, for example, a device for storing data using an electronic element and communicating data in a non-contact state with a reader/writer is used. An electromagnetic coupling method, an optical communication method, a microwave method and an electro-magnetic induction method are the methods of communication between the data carrier and the reader/writer, and which are used depending on the system design. There are a read-only type, and a read and write type as the forms of access. In this embodiment, in order to make the re-writing of data possible, a read and write type is assumed to be used.

Figure 2:
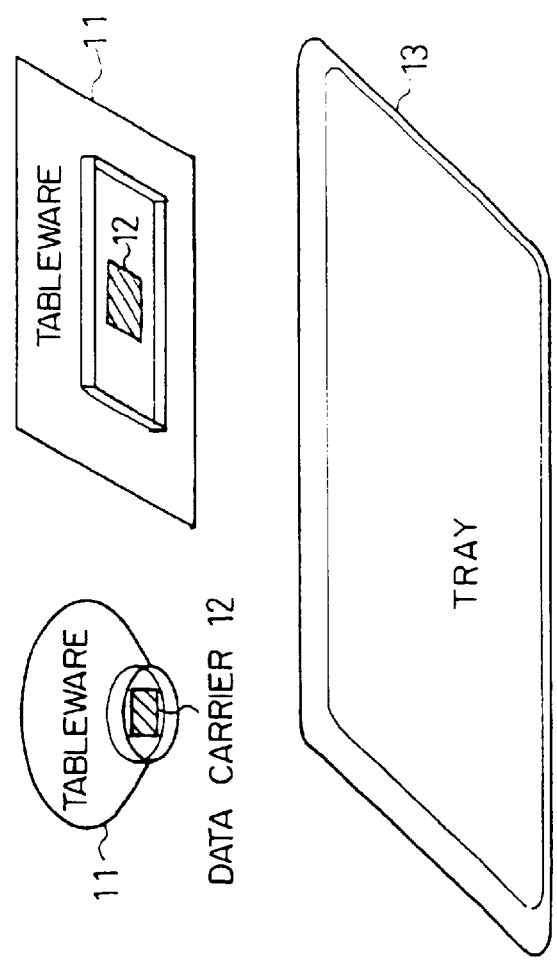
FIG. 2 shows mounting positions of data carriers.

FIG. 2 shows examples of the mounting positions of data carriers. In FIG. 2, data carriers 12 are embedded in the bottom of items of tableware 11 of a dish, such as a plate, a bowl, etc., and these items of tableware 11 are carried on a tray 13. Both tableware 11 and tray 13 are made of a non-metallic material (for example, plastics) so as not to have an influence on the detection by the data carrier 11. The same applies to a cup, glass, etc. for drinks.

Even if the data carrier 12 is directional in data communication, by embedding the data carriers 12 in the bottom of tableware 11 and arranging the tableware 11 flatly on one plane, the directions of the data carriers 12 can be accurately orientated. In FIG. 2, the reader/writer detects the data carrier 12 from either the upward or downward direction of the tray 13, and thereby communicates with the data carrier 12.

Figure 3:
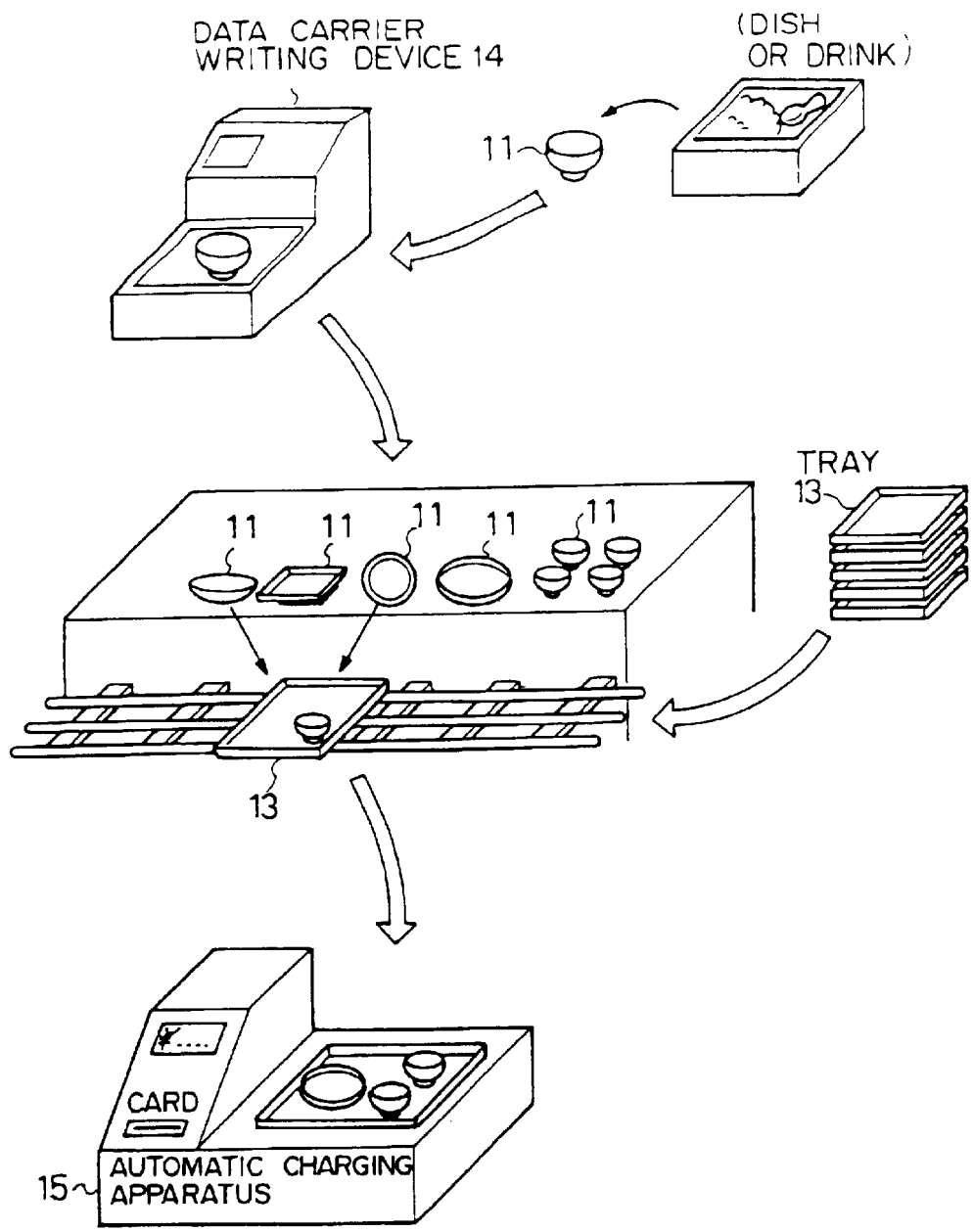
FIG. 3 shows the configuration of a charging system.
Figure 4:
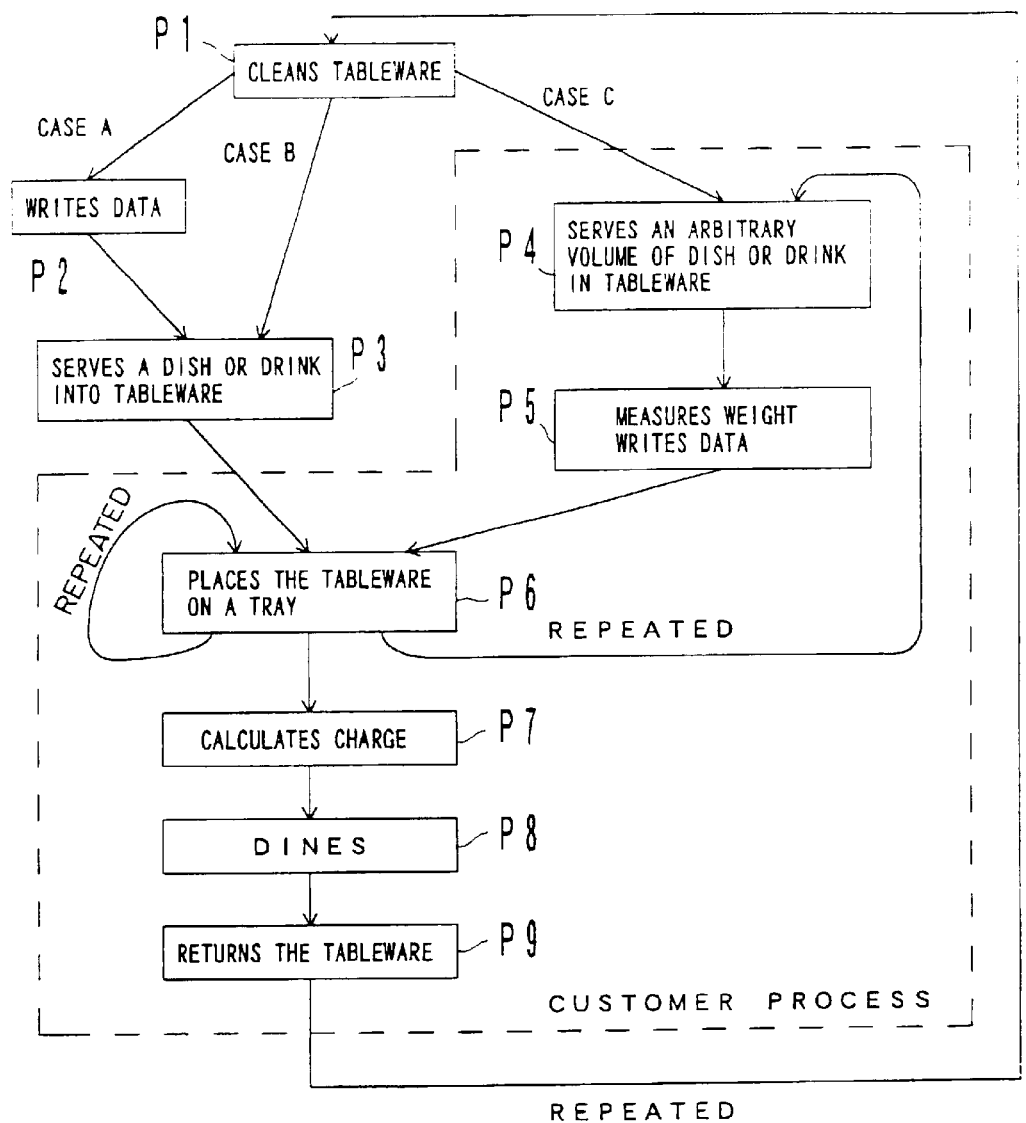
FIG. 4 shows an operating flow in a charging system.

FIG. 3 shows the configuration of the charging system of this embodiment. The system shown in FIG. 3 comprises a data carrier writing device 14 for writing data such as price, etc. in the data carrier 12 embedded in each item of tableware 11, and an automatic charging apparatus 15 for calculating the charge for the dishes and drinks placed on a tray 13. FIG. 4 shows an operating flow in this charging system.

First, after an employee cleans tableware 11 (P1), the flow proceeds according to one of cases A, B and C. Case A is applied to tableware 11 which is repeatedly used for a plurality of different dishes and drinks, and Case B is applied to tableware the use of which is fixed. Case C is applied to a case where a customer decides on the volume of selected dishes or drinks.

In case A, the employee writes data in the data carrier 12 of an item of tableware 11 using the data carrier writing device 14 (P2), and serves dishes and drinks corresponding to the data into the item of tableware 11 (P3). In this case, the kind and price of a dish or drink are written in the data carrier 12.

Then, a customer selects the tableware 11 containing his/her favorite dishes and drinks, and places the tableware 11 on a tray 13 (P6). Step P6 is repeated according to the number of selected dishes and drinks. Then, the customer carries the tableware 11 to the automatic charging apparatus 15, and pays for the selected dishes and drinks (P7). When the customer has dined (P8) and returned the tableware 11 (P9), steps P1 and after are repeated again.

In case B, since data corresponding to dishes and drinks are already written in the data carrier 12 and there is no need to change the data, the employee serves a predetermined dish into the tableware 11 (P3). In this case too, the kind and price of a dish or drink is written in the data carrier 12. In the same way as in case A, the customer carries out steps P6 and after.

In case C, the customer serves a desired volume of a favorite dish or drink into the tableware 11 (P4). Then, the customer measures the weight of the dish or drink using the data carrier writing device 14, which writes data such as price, etc. according to the weight of the dish or drink in the data carrier 12 (P5). In this case, the kind, unit price (price per unit weight), weight and price calculated by multiplying the unit price by the weight of the dish or drink are written in the data carrier 12. Then, in the same way as in case A, the customer carries out steps P6 and after, and repeats steps P4, P5 and P6 as necessary.

In this way, in case A, the data of the data carrier 12 is re-written every time depending on the kind and price of a dish or drink to be served in tableware 11, and in case B, the data of the data carrier 12 is not re-written, as long as a menu is not changed. In case C, data is written in the data carrier 12 according to the kind, unit price and weight of a served dish or drink.

Next, the communication method between a plurality of data carriers and a reader/writer is described below with reference to FIGS. 5 to 8.

Figure 5:
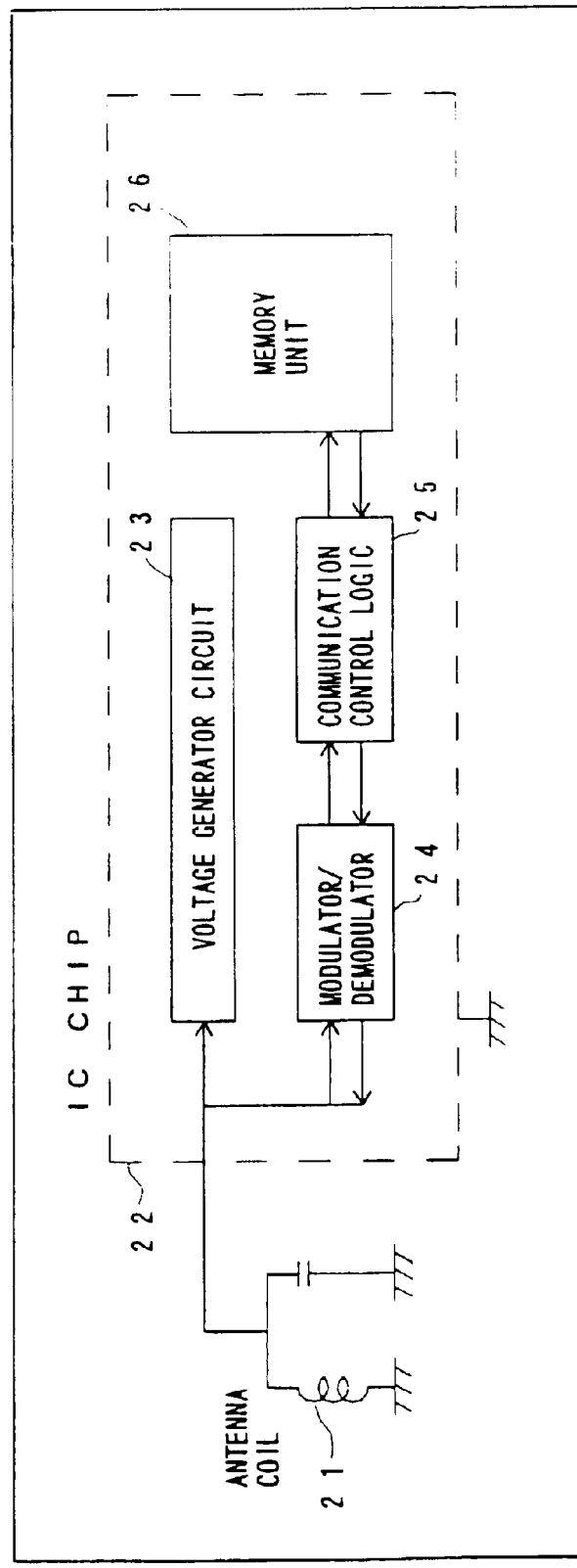
FIG. 5 shows the configuration of a data carrier.

FIG. 5 shows the configuration of a data carrier. The data carrier shown in FIG. 5 comprises an antenna coil 21 and an IC (integrated circuit) chip 22. The IC chip 22 comprises a voltage generator circuit 23, a modulator/demodulator circuit 24, a communication control logic 25 and a memory unit 26. A reader/writer, not shown in the drawing, comprises an antenna for communicating with the data carrier, and a transmitter-receiver unit for communicating with a computer.

The reader/writer, for example, generates a local electromagnetic field using a weak electric signal, and thereby calls up the data carrier. When a data carrier is held over the induced electro-magnetic field, electromotive force is generated in the antenna coil 21 being a conductor, and the voltage generator circuit 23 generates the power source voltage of the data carrier from this electromotive force.

At this time, the antenna coil 21 transmits and receives data by communication with the antenna of the reader/ writer. The modulator/demodulator circuit 24 modulates transmission data, and demodulates received data. The communication control logic 25 reads the transmission data from the memory unit 26, and stores the received data in the memory unit 26. Thus, data is read from the memory unit 26 of the data carrier to the reader/writer, and is written from the reader/writer to the memory unit 26.

Figure 6:
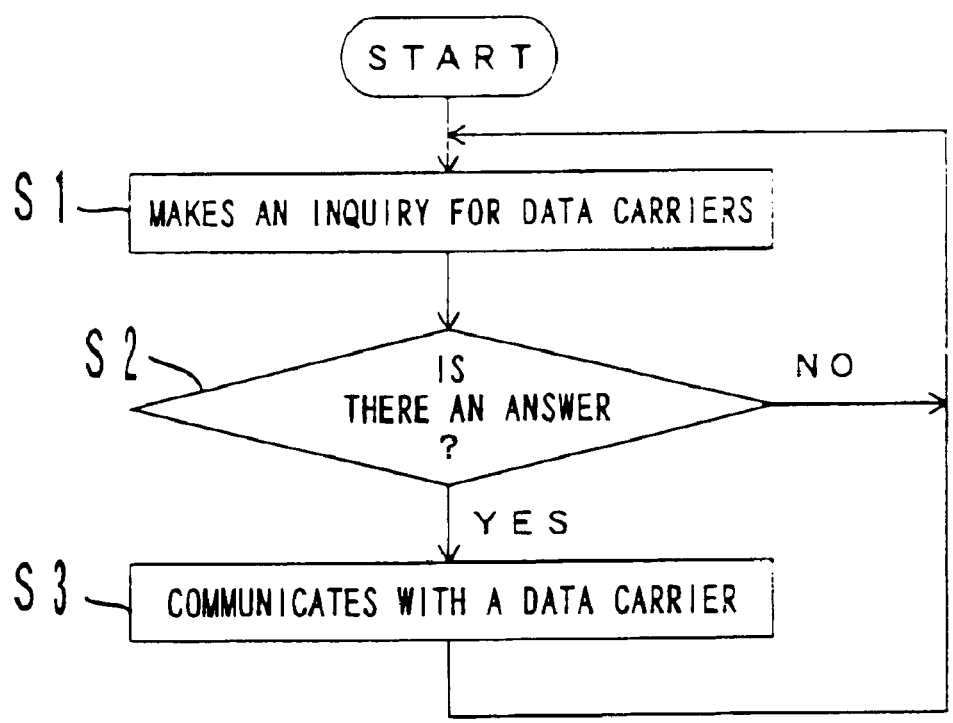
FIG. 6 is a flowchart showing the operation of a reader/writer.

FIG. 6 is a flowchart showing the operation of a reader/writer. First, the reader/writer generates an electromagnetic field, makes an inquiry for (calls up) data carriers (step S1), and judges whether or not there is an answer (step S2). If there is an answer from any data carrier, the reader/writer communicates with the data carrier, reads or writes data (step S3), and repeats steps S1 and after.

If there are answers from a plurality of data carriers in step S2, the reader/writer reads or writes the data of the data carrier which answered first. If there is no answer from a data carrier, the reader/writer repeats steps S1 and after.

Figure 7:
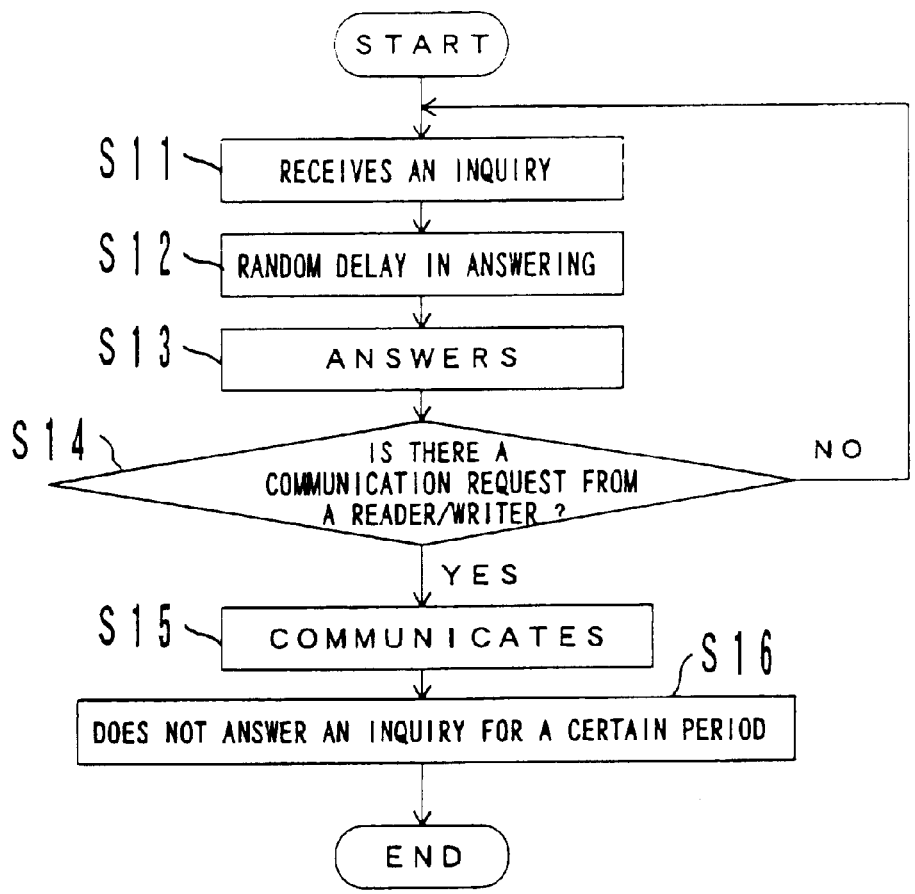
FIG. 7 is a flowchart showing the operation of a data carrier.

FIG. 7 is a flowchart showing the operation of a data carrier. First, when the data carrier detects an electromagnetic field generated by a reader/writer and receives an inquiry (step S1), under the control of the communication control logic 25, the data carrier answers the inquiry (step S13) after delaying for a certain period which is set at random (step S12).

Then, the data carrier judges whether or not there is a communication request from the reader/writer (step S14). If there is a communication request, the data carrier communicates with the reader/writer, and stores received data in the memory unit 26 or transmits data read from the memory unit 26 (step S15).

Under the control of the communication control logic 25, the data carrier enters a state where it does not answer an inquiry from the reader/writer for a certain period (step S16), and terminates the operation. If there is no communication request from the reader/writer in step S14, the data carrier repeats steps S11 and after.

Figure 8:
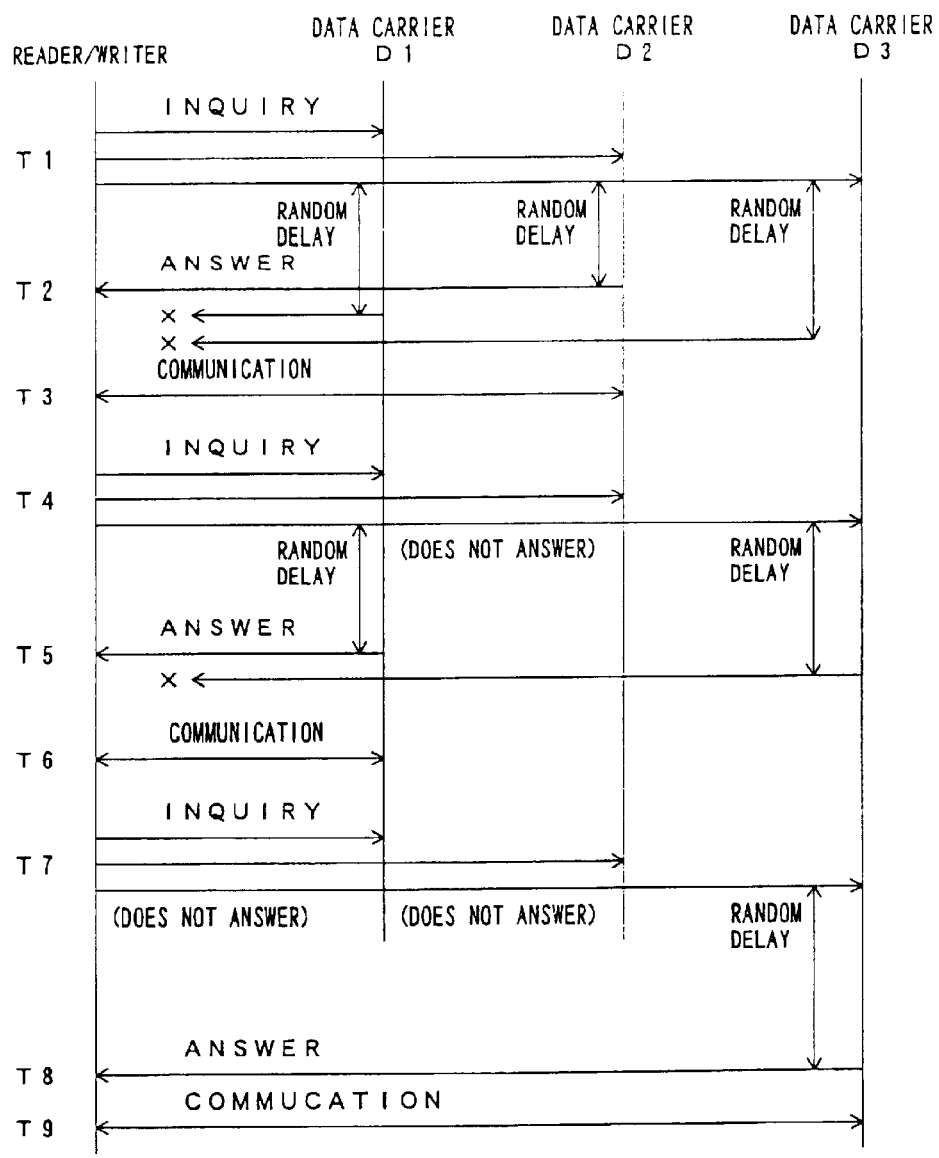
FIG. 8 shows the protocol procedure of a read/write operation.
Figure 15:
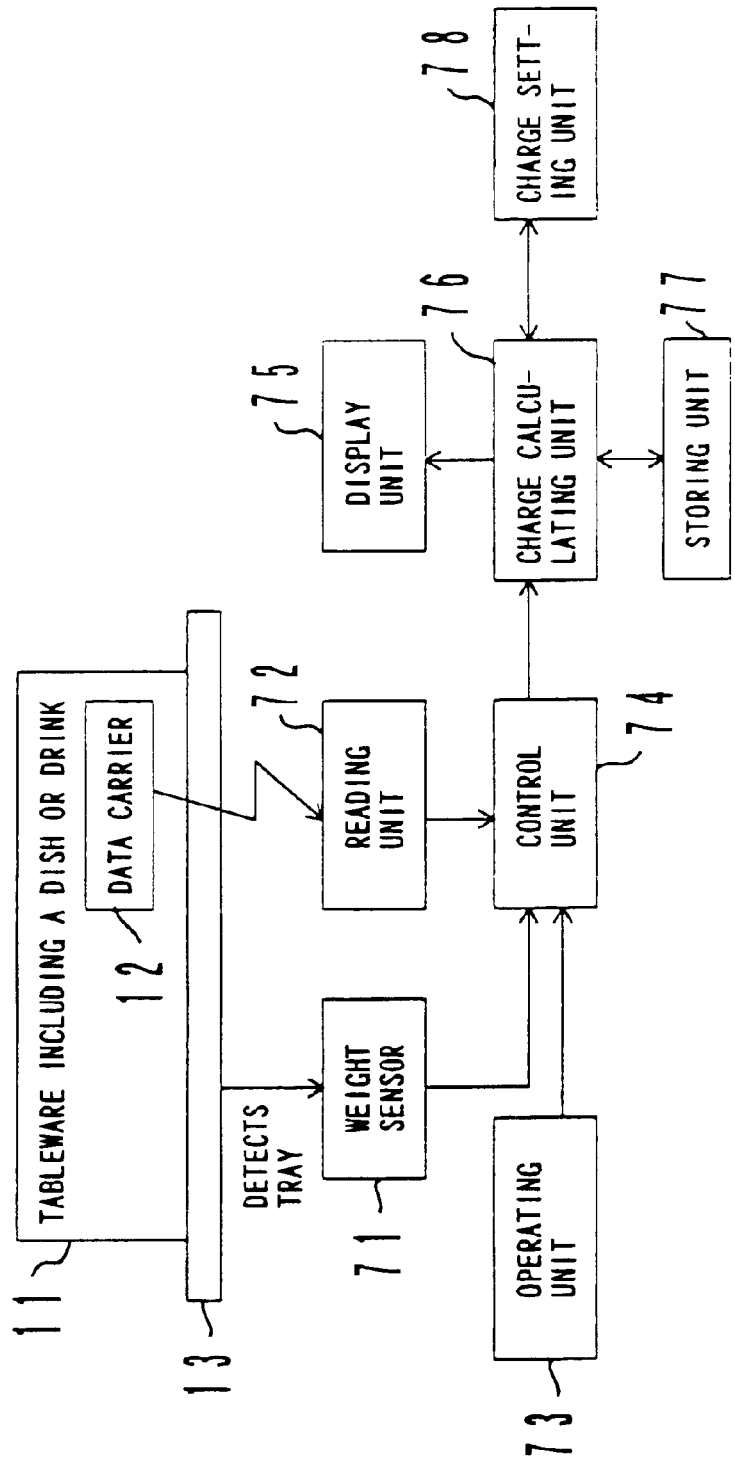
FIG. 15 shows the configuration of an automatic charging apparatus.

FIG. 8 shows the protocol procedure in the case where the reader/writer mounted on the automatic charging apparatus 15 shown in FIG. 15 communicates with data carriers D1, D2 and D3 embedded in each of three items of tableware on a tray. In FIG. 8, first, when the reader/writer transmits an inquiry for data carriers (T1), the data carriers D1, D2 and D3 which receive the inquiry, delay in answering for random periods, and then transmit answers to the reader/writer (T2). Out of the data carriers D1, D2 and D3, the data carrier D2 which answers first communicates with the reader/writer, and its data is read (T3).

Then, when the reader/writer transmits an inquiry for data carriers again (T4), out of the data carriers D1, D2 and D3 which receive the inquiry, only D1 and D3 delay in answering for random periods, and then transmit answers to the reader/writer (T5). At this time, the data carrier D2 which has already communicated with the reader/writer does not transmit an answer. Then, the data carrier D1 which answered first, communicates with the reader/writer, and its data is read (T6).

Then, when the reader/writer transmits an inquiry for data carriers again (T6), out of the data carriers D1, D2 and D3 which receive the inquiry, only D3 delays in answering for a random period, and then transmits an answer to the reader/writer (T8). At this time, the data carriers D1 and D2 which have already communicated with the reader/writer do not transmit answers. Then, the data carrier D3 communicates with the reader/writer, and its data is read (T9).

In this way, by the reader/writer communicating with the data carriers one by one, data are read from a plurality of data carriers in order, and are input to the automatic charging apparatus 15.

Next, the detailed configuration and operation of both data carrier writing device 14 and automatic charging apparatus 15 shown in FIG. 3 are described below with reference to FIGS. 9 to 19.

Figure 9:
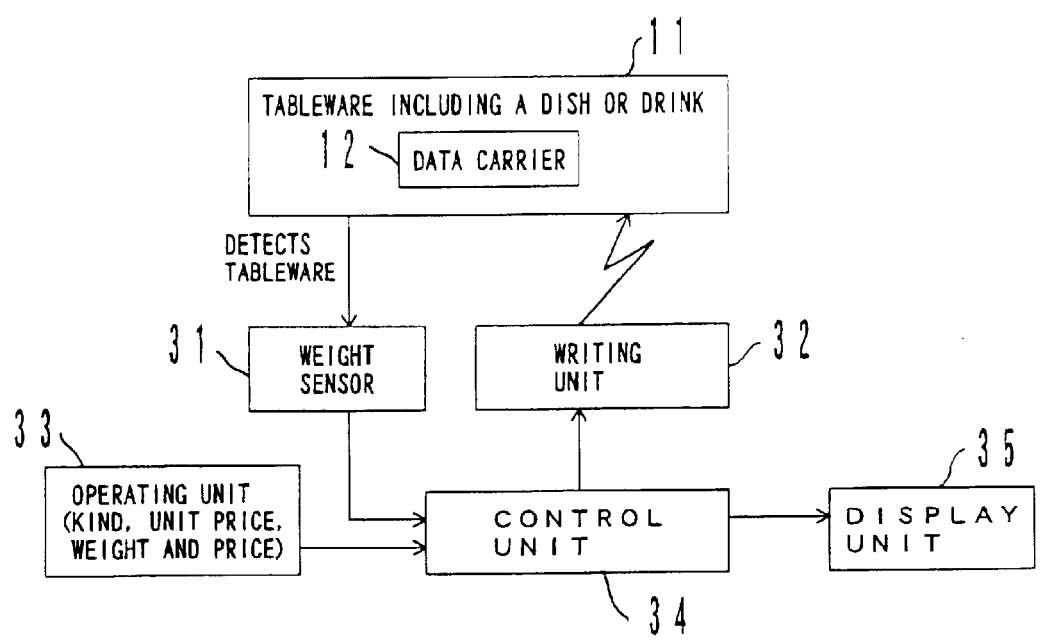
FIG. 9 shows the configuration of a first data carrier writing device.
Figure 10:
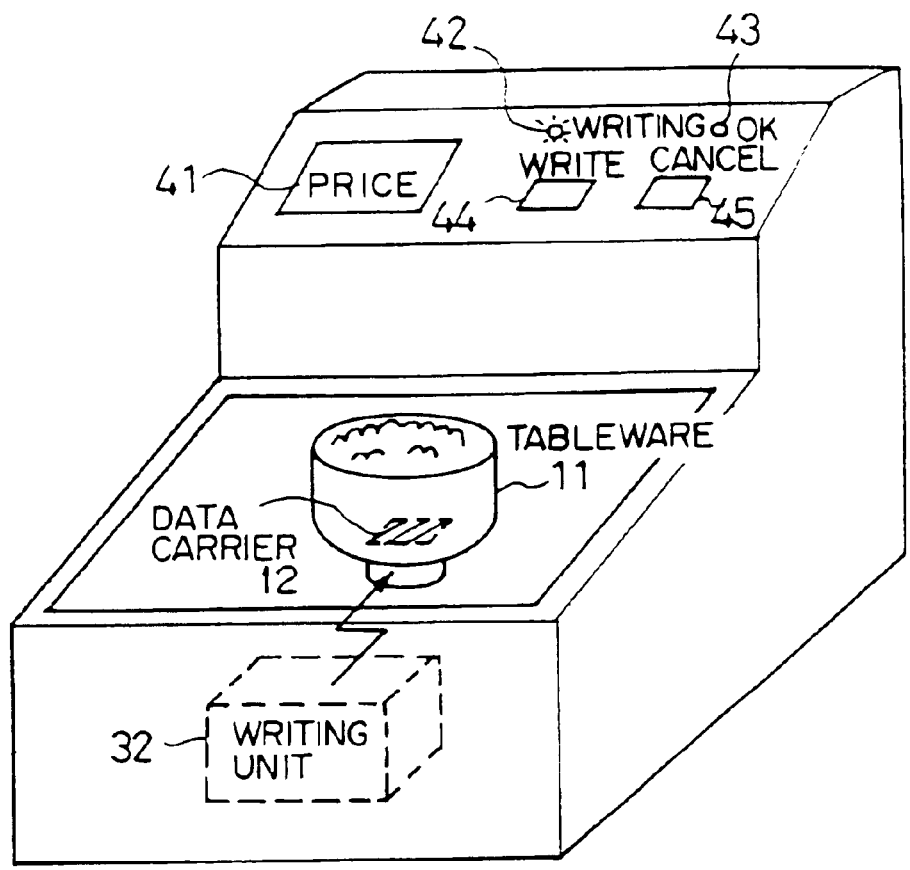
FIG. 10 shows the appearance of a first data carrier writing device.

FIG. 9 shows the configuration of the data carrier writing device in which weight is not measured. FIG. 10 shows the appearance of the data carrier writing device. This data carrier writing device comprises a weight sensor 31, a writing unit 32, an operating unit 33, a control unit 34 and a display unit 35. The display unit 35 further comprises a display 41; a light emitting diode (LED) 42 which indicates while writing, and an LED 43 for indicating that the result of writing is acceptable. The operating unit 33 further comprises a write button 44 and a cancel button 45, and the writing unit 32 corresponds to the reader/writer in the above-mentioned case.

Figure 11:
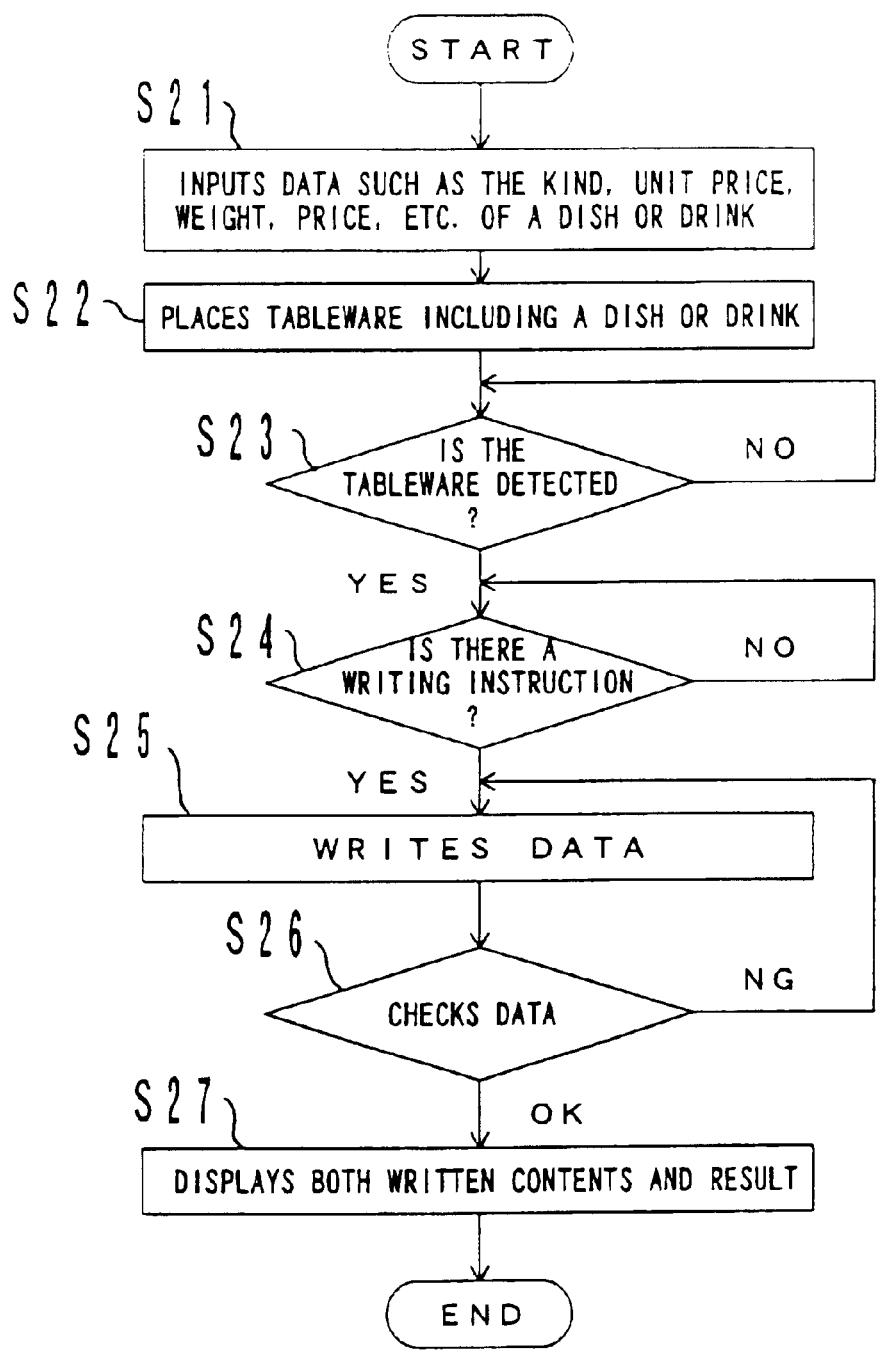
FIG. 11 is a flowchart showing the operation of a first data carrier writing device.

FIG. 11 is a flowchart showing the operation of the data carrier writing device shown in FIG. 9. First, the employee inputs data such as the kind, unit price, weight, price, etc. of a dish or drink to the operating unit 33 (step S21), places tableware 11 containing the corresponding dish or drink on the top of the data carrier writing device shown in FIG. 10 (step S22). The control unit 34 judges whether tableware 11 is detected based on a signal from the weight sensor 31 (step S23). When the weight sensor 31 detects the weight of the tableware 11 and reports the weight to the control unit 34, the control unit 34 judges that tableware 11 has been detected, and then judges whether or not data are instructed to be written based on a signal from the operating unit 33 (step S24).

When the employee presses the write button 44 on the operating unit 33, the operating unit 33 reports the instruction to the control unit 34, and the control unit 34 instructs the writing unit 32 to write data (step S25). Then, the writing unit 32 writes the data input in step S21 in the data carrier 12, and the control unit 34 lights the LED 42.

Then, the writing unit 32 checks the written data (step S26). In this case, data are checked, for example, by repeating a predetermined number of data readings. If the read data are not correct, the writing unit 32 re-writes the data again (step S25).

If the read data are correct, the control unit 34 displays the written data contents on the display 41 (step S27). To indicate that the writing is carried out correctly the control unit 34 extinguishes the LED 42 and lights the LED 43, and terminates the operation.

The employee can also cancel the writing operation by pressing the cancel button 45 while the LED 42 is lit, and try again from the data inputting step. The data carrier writing device such as this is mainly used in the above cases A and B.

Figure 13:
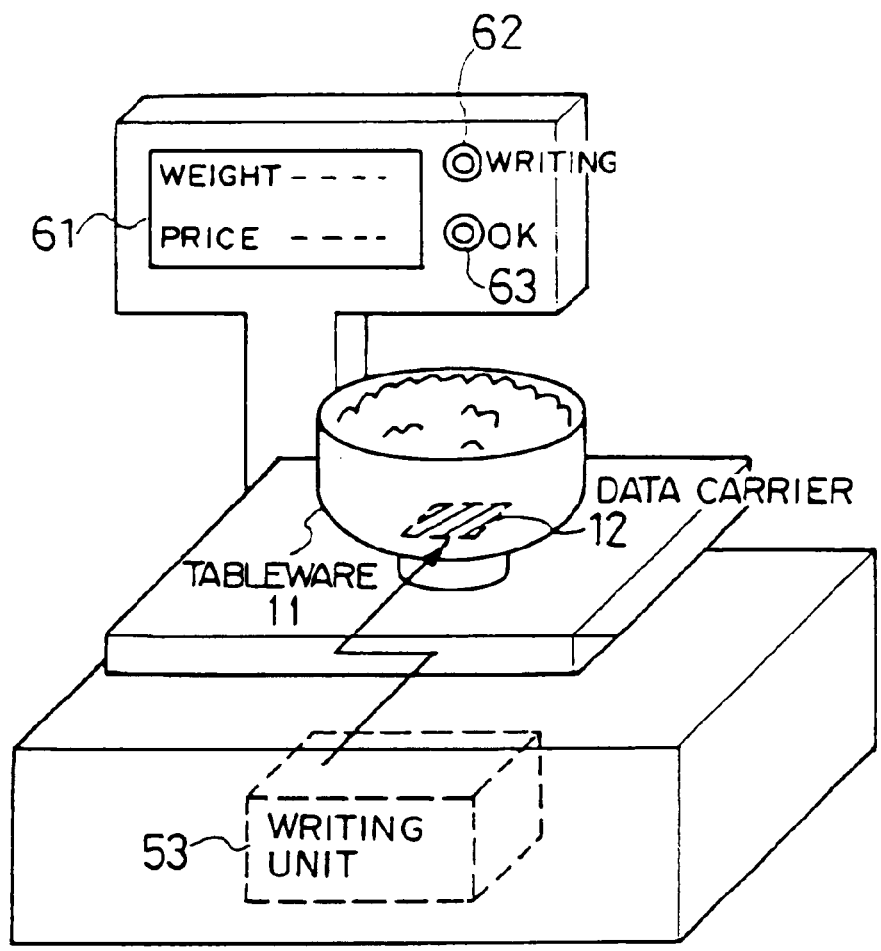
FIG. 13 shows the appearance of a second data carrier writing device.

Next, FIG. 12 shows the configuration of the data carrier writing device in which weight is measured. FIG. 13 shows the appearance of the data carrier writing device. This data carrier writing device comprises a weight measuring unit 51, a writing unit 53, an operating unit 54, a control unit 55 and a display unit 56. The weight measuring unit 51 further comprises a weight sensor 52, and the display unit 56 further comprises a display 61, an LED 62 which indicates while writing, and an LED 63 for indicating that the result of writing is acceptable. The writing unit 53 corresponds to the reader/writer in the above-mentioned case.

Figure 14:
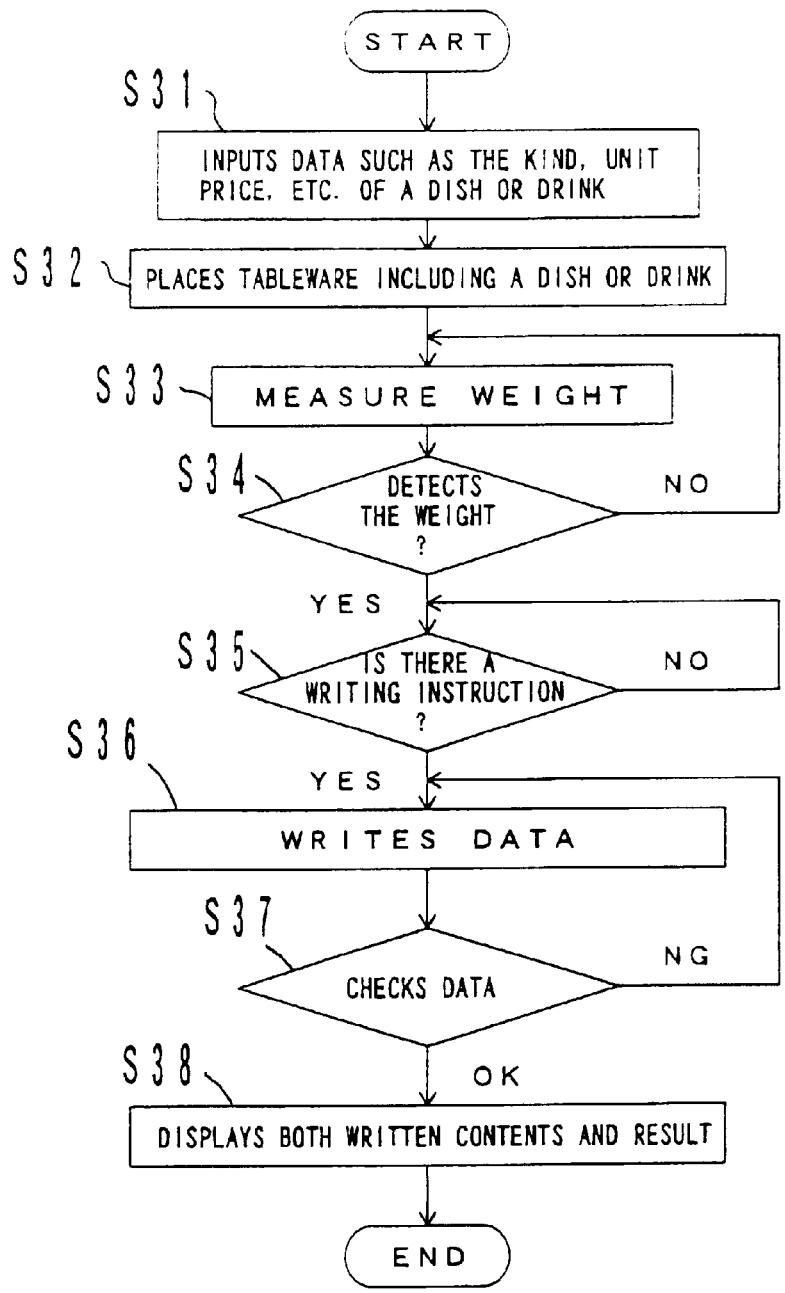
FIG. 14 is a flowchart showing the operation of a second data carrier writing device.

FIG. 14 is a flowchart showing the operation of the data carrier writing device shown in FIG. 12. The employee inputs in advance data such as the kind, unit price, etc. of a dish or drink to the operating unit 54 (step S31), and the customer places tableware 11 with a dish or drink on the top of the data carrier writing device (step S32).

The weight measuring unit 51 measures the weight of the tableware 11 and reports the result of measurement to the control unit 55. The weight sensor 52 detects whether or not tableware is placed thereon, and reports the result of this detection to the control unit 55 (step S33).

The control unit 55 judges whether or not tableware 11 is detected based on a signal from the weight sensor 52 (step S34). If tableware 11 is detected, then the control unit 55 judges whether or not data are instructed to be written based on a signal from the operating unit 54 (step S35).

When the customer instructs to write from the operating unit 54, the control unit 55 instructs the writing unit 53 to write (step S36). Then, the writing unit 53 writes data in the data carrier 12, and the control unit 55 lights the LED 62. In this case, besides the data input in step S31, the measured weight, price, etc. of a dish or drink are written.

The weight data to be written may or may not include the weight of the tableware 11 itself. For example, by subtracting the weight of the tableware 11 itself measured in advance from the total measured weight, the weight of only a dish or drink can be calculated. By multiplying a unit price by the weight of a dish or drink, the price of a served dish can also calculated.

Then, in the same way as in step S26 shown in FIG. 11, the writing unit 53 checks the written data (step S37), and if the data are not correct, the writing unit 53 re-writes the data again (step S36).

If the read data are correct, the control unit 55 displays the written contents on the display 61 (step S38). In this case, to indicate that writing is carried out correctly, the control unit 55 extinguishes the LED 62 and lights the LED 63, and terminates the operation. Although a data carrier writing device such as this is mainly used in case C shown in FIG. 4, this device can also used in cases A and B.

Next, FIG. 15 shows the configuration of an automatic charging apparatus. This automatic charging apparatus comprises a weight sensor 71, a reading unit 72, an operating unit 73, a control unit 74, a display unit 75, a charge calculating unit 76, a storing unit 77 and a charge settling unit 78. Out of these units the reading unit 72 corresponds to the reader/writer in the above-mentioned system.

Figure 16:
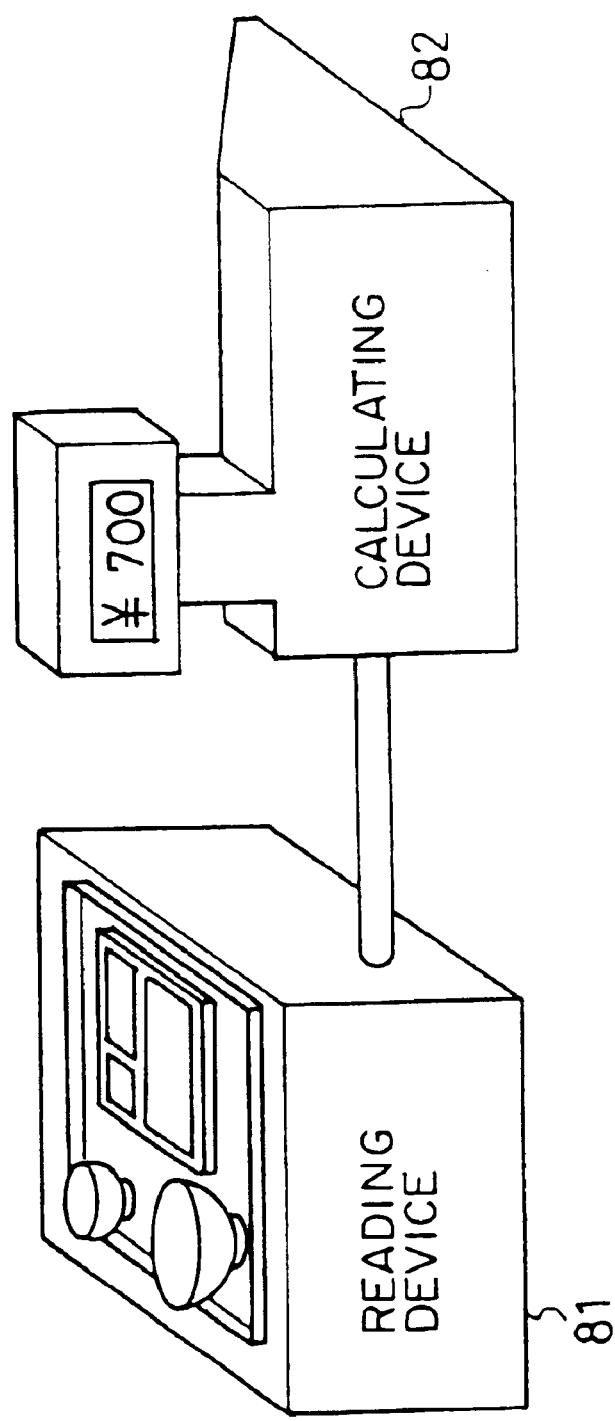
FIG. 16 shows the appearance of an automatic charging apparatus.

Although the appearance of the automatic charging apparatus is shown in FIG. 3, the automatic charging apparatus can also be configured as shown in FIG. 16. The automatic charging apparatus shown in FIG. 16 comprises a reading device 81 and a calculating device 82. For example, the reading device 81 comprises the weight sensor 71 and the reading unit 72 shown in FIG. 15, and the calculating device 82 comprises the operating unit 73, control unit 74, display unit 75, charge calculating unit 76, storing unit 77 and charge settling unit 78.

Figure 17:
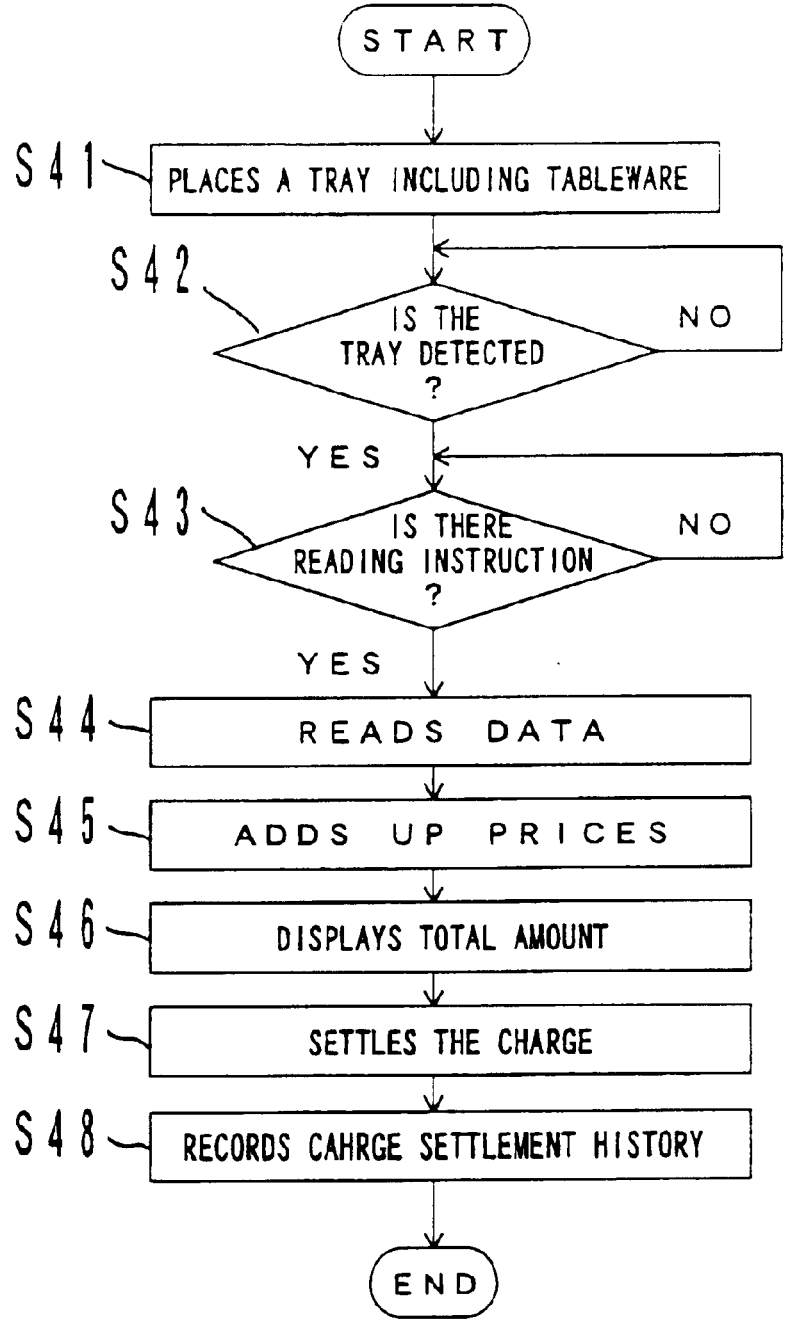
FIG. 17 is a flowchart showing the operation of an automatic charging apparatus.

FIG. 17 is a flowchart showing the operation of the automatic charging apparatus. First, the customer places a tray 13 with tableware 11 on the reading device 81 (step S41).

The control unit 74 judges whether or not the tray 13 is detected based on a signal from the weight sensor 71 (step S42). When the weight sensor 71 detects the weight of the tray 13 and reports the weight to the control unit 74, the control unit 74 judges that the tray 13 is detected, and then judges whether or not data reading is instructed based on a signal from the operating unit 73 (step S43).

When the customer instructs to read via the operating unit 73, the control unit 74 instructs the reading unit 72 to read data (step S44). Then, the reading unit 72 reads data from the data carriers 12 of all the tableware 11 on the tray 13 as described above, and sends the read data to the charge calculating unit 76 via the control unit 74.

The charge calculating unit 76 calculates the total amount by adding up all received price data (step S45), and displays the total amount on the display of the display unit 75 (step S46). The charge settling unit 78 settles the total amount received from the charge calculating unit 76 in a method designated by the customer, and prints out the amount on a detailed statement (receipt) including the kind and price of each dish, total amount, etc. (step S47). The customer pays for the charge, for example, in cash, with a prepaid card, with an ID card or with a credit card.

When the charge calculating unit 76 receives from the charge settling unit 78 a report that the charge is settled, the charge calculating unit 76 stores the charge settlement history information in the storing unit 77, and terminates the operation. Thus, the amount charged for dishes and drinks selected by the customer is automatically settled.

Although in this embodiment it is assumed that the kind, unit price, weight and price are all written in the data carrier, a part of this data can also be stored in the storing unit 77 of the automatic charging apparatus in advance, to be referred to when calculating.

For example, in cases A and B shown in FIG. 4, only the kind of dishes and drinks is written in the data carrier, and a correspondence table between the kind and price of dishes and drinks is stored in the automatic charging apparatus in advance. In this case, in step S45 shown in FIG. 17, the charge calculating unit 76 reads the price data from the storing unit 77 corresponding to the read data on the kind of a dish or drink, and calculates total amount using these data.

However, if only the price of dishes and drinks is written in the data carrier in advance, information on the kind of a dish or drink cannot be obtained. Therefore, if at least the kind and price are written in advance, the charge can be calculated without referring to the table, and the kind of a dish or drink can be output.

In case C shown in FIG. 4, only the kind and weight of dishes and drinks are written in the data carrier in advance, and a correspondence table between the kind and price of dishes and drinks is stored in the automatic charging apparatus. In this case, in step S45 shown in FIG. 17, the charge calculating unit 76 reads the unit price data corresponding to the kind of a dish or drink from the storing unit 77, and calculates the price of each dish or drink and the total amount using both the unit price data and weight data.

However, if only the price of dishes and drinks or only the weight and price are written in the data carrier in advance, information on the kind of a dish or drink cannot be obtained. Therefore, if at least the kind and price are written in the data carrier in advance, can the charge be calculated without referring to the table, and can the kind of a dish or drink be output. The calories of a dish or drink can also be calculated using data written in the data carrier. For example, the kind and weight of dishes and drinks are written in the data carrier, and a correspondence table between the kind and calories per unit weight is stored in the automatic charging apparatus in advance.

The automatic charging apparatus reads the calories data per unit weight corresponding to the kind of a dish or drink, and calculates both the calories of each dish or drink and the total calories using both calorie data and weight data. The result of the calories calculation is displayed on the display and output on a detailed statement.

Further, the calories per unit weight can be handled in the same way as the above-mentioned unit price, and can be written in the data carrier in advance. In this case, since the calories of each dish or drink can be obtained by multiplying calories per unit weight by weight, the table is not needed.

Figure 18:
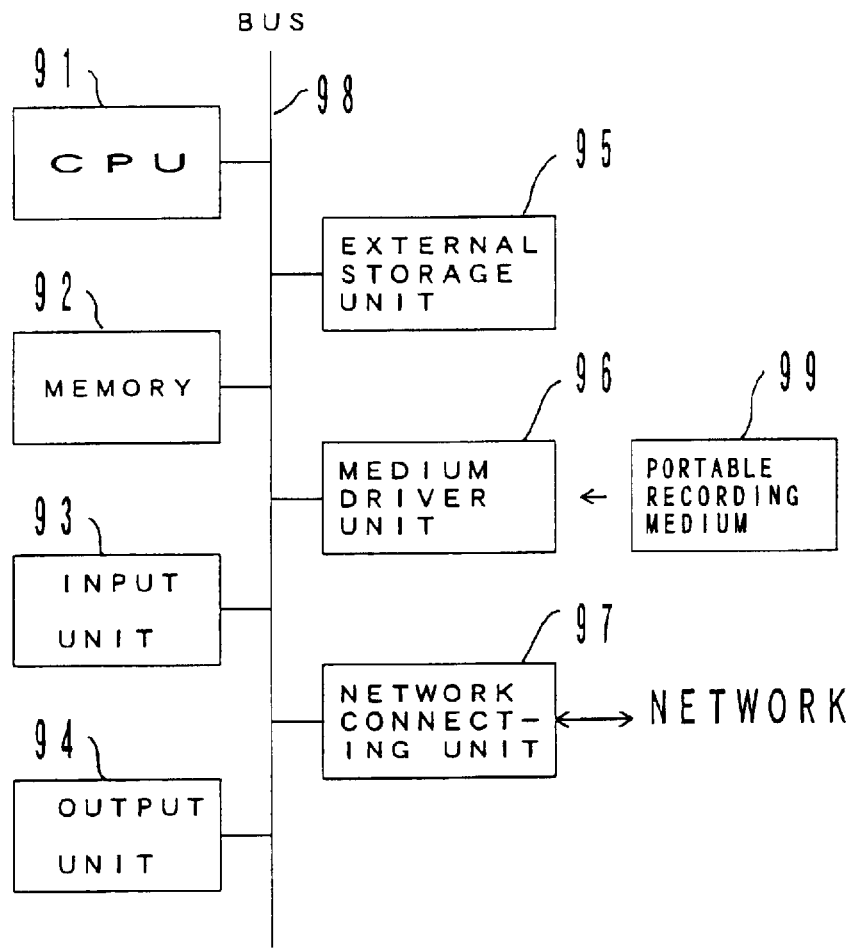
FIG. 18 shows an information processing device.

The above-mentioned data carrier writing device or automatic charging apparatus comprises, for example, an information processing device (computer) as shown in FIG. 18. The information processing device shown in FIG. 18 comprises a CPU (central processing unit) 91, a memory unit 92, an input unit 93, an output unit 94, an external storage unit 95, a medium driver unit 96 and a network connecting unit 97, which are connected with each other by a bus 98.

The memory unit 92 stores programs for processing as well as data. The memory unit 92 comprises, for example, a ROM (read only memory), a RAM (random access memory), etc. The CPU 91 executes each of the above-mentioned processes of the charging system by running programs using the memory unit 92.

The input unit 93 corresponds to the above-mentioned operating unit 33, 54 or 73, and includes an operation button, a keyboard, a scanner, etc. This input unit 93 is used to input necessary instructions and data. The output unit 94 corresponds to the above-mentioned display unit 35, 56 or 75, and outputs data such as price, weight, etc.

The external storage unit 95 uses, for example, a magnetic disk, an optical disk, a magneto-optical disk, etc. This external storage unit 95 stores the above-mentioned programs and data, which can also be used by being loaded to the memory unit 92, if necessary. The above-mentioned storing unit 77 corresponds to the memory unit 92 or the external storage unit 95.

The medium driver unit 96 drives a portable recording medium 99, and accesses the recorded contents of the recording medium. The portable recording medium 99 uses an arbitrary computer-readable recording medium, such as a memory card, a floppy disk, a CD-ROM (compact disk read only memory), an optical disk, a magneto-optical disk, etc. This portable recording medium 99 stores in advance both the above-mentioned programs and data, which can be used by being loaded to the memory unit 92, if needed.

The network connecting unit 97 communicates with an external device via an arbitrary network of a LAN (local area network), etc. Thus, the above-mentioned programs and data can also be obtained from the external device, and be used by being loaded to the memory unit 92.

Figure 19:
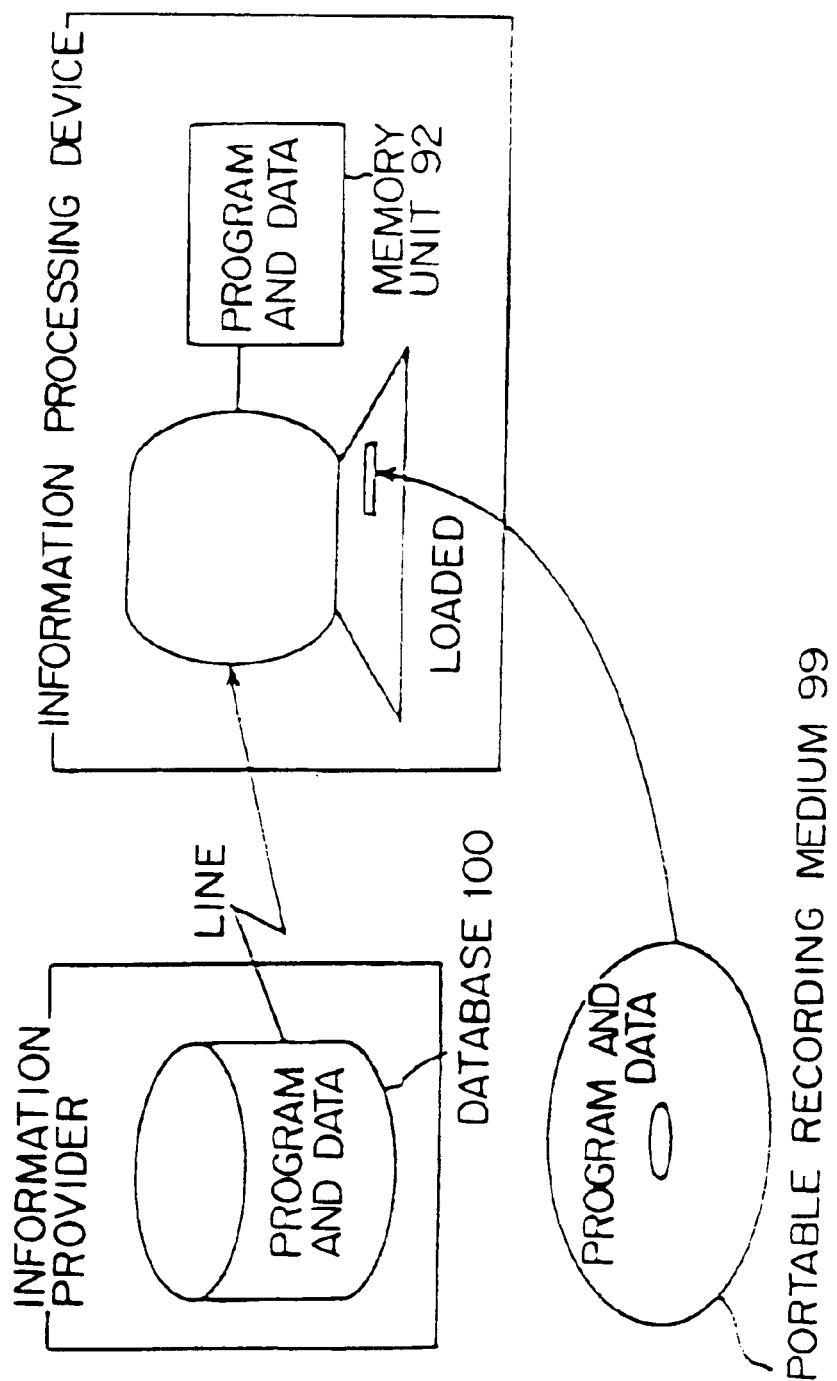
FIG. 19 shows recording media.

FIG. 19 shows the configuration of a computer readable recording medium which can provide the information processing device shown in FIG. 18 with programs and data. The programs and data stored in the portable recording medium 99 or a database 100 can be loaded to the memory unit 92. The CPU 91 executes the necessary processes by running the programs using the data.

Although in the embodiment described above, a data carrier stores data using an electronic element, data can also recorded using bar codes, etc. instead of the electronic element. In this case, data can be read using a bar code reader.

Although an embodiment in a cafeteria is described here, the present invention can be widely used when the charge for many kinds of goods selected by a customer is to be settled collectively. For example, if in a shop such as a supermarket, etc. a data carrier is attached to the surface of goods, and goods selected by the customer are arranged flatly on one plane using a tray, etc., the direction of all data carriers becomes the same. Therefore, even if a directional data carrier is used, data can be read collectively, and the charge can be automatically calculated.

In this case, since data carriers are taken away together with goods by a customer, it is desirable the unit price of a data carrier to be sufficiently low. For this reason, the utility value of this type of automatic charging system will be increased when a cheap data carrier becomes available in the future.

In the present invention, by attaching a re-writable data carrier to tableware, prices can be flexibly set for many kinds of dishes and drinks provided in a cafeteria, etc. Furthermore, the charge and calories of dishes and drinks selected by the customer can be easily calculated.

What is claimed is:

1. A charging system for automatically calculating a charge for a dish or drink selected by a customer, comprising:

writing means for writing data in at least two re-writable data carriers, each of the re-writable data carriers being attached to a container of a dish or drink;

reading means for reading data in a non-contact state from the re-writable data carriers by repeating an inquiry, each of the re-writable data carriers including a communication control logic to cause each of the re-writable data carriers to enter a state of waiting a predetermined random period before answering the inquiry from the reading means, to answer the inquiry from the reading means, to communicate with the reading means, and to enter a state of not answering another inquiry from the reading means after communicating with the reading means for a predetermined period; and calculating means for calculating the charge using the read data and displaying the charge.

2. A charging system for automatically calculating a charge for a dish or drink selected by a customer, comprising:

input means for inputting data to be used to calculate a charge; and writing means for writing the data in at least two re-writable data carriers each of which is attached to a container of a dish or drink and each of the re-writable data carriers entering a state of waiting a predetermined random period before answering an inquiry from the writing means, to answer the inquiry from the writing means, to communicate with the writing means, and to enter a state of not answering another inquiry from the writing means after communicating with the writing means for a predetermined period.

3. The charging system according to claim 2, wherein said writing means writes one of a kind and price of the dish or drink in the data carriers.

4. The charging system according to claim 2, further comprising:

measuring means for measuring a weight of the dish or drink, wherein said writing means writes one of a measured weight and a price corresponding to the measured weight in the data carriers.

5. A charging system for automatically calculating a charge for a dish and drink selected by a customer, comprising:

reading means for reading data in a non-contact state from at least two re-writable data carriers by repeating an inquiry, attached to a container of one or more dishes or drinks selected by the customer, each of the re-writable data carriers entering a state of waiting a predetermined random period before answering the inquiry from the reading means, to answer the inquiry from the reading means, to communicate with the reading means, and to enter a state of not answering another inquiry from the reading means after communicating with the reading means for a predetermined period and calculating means for calculating the charge using the read data.

6. The charging system according to claim 5, wherein the data carriers are attached to the bottom of the container, and said reading means reads the data collectively from the data carrier of one or more containers placed on a tray.

7. The charging system according to claim 5, wherein said reading means reads price data of said dish or drink from the data carriers, and said calculating means adds up the price data of each dish or drink, and calculates the charge for the one or more dishes or drinks.

8. The charging system according to claim 5, wherein said reading means reads data indicating a kind of said dish or drink from the data carriers, and said calculating means includes an output means for outputting a kind of the dishes or drinks selected by the customer together with the charge for the dishes or drinks.

9. The charging system according to claim 5, further comprising storing means for storing a correspondence relation between a kind and a price of each dish or drink, wherein said reading means reads data indicating a kind of said dish or drink from the data carriers, and said calculating means obtains price data corresponding to the kind data of each dish or drink referring to the correspondence relation, adds up the price data of each dish or drink, and calculates the charge for the one or more dishes or drinks.

10. A container used in connection with reading means for reading data for an automatic calculation of a charge of a dish or drink selected by a customer, comprising:

means for holding the dish or drink; and at least two re-writable data carrier means for selectively recording data to be used to calculate the charge, each of the re-writable data carrier means being attached to a container of the dish or the drink and entering a state of waiting a predetermined random period before answering an inquiry from the reading means, to answer the inquiry from the reading means, to communicate with the reading means, and to enter a state of not answering another inquiry from the reading means after communicating with the reading means for a predetermined period.

11. A calorie calculating system for automatically calculating calories of a dish or drink selected by a customer, comprising:

reading means for reading data in a non-contact state from at least two re-writable data carriers by repeating an inquiry, each of the re-writable data carriers being attached to a container of one or more dishes or drinks selected by the customer, each of the re-writable data carriers entering a state of waiting a predetermined random period before answering the inquiry from the reading means, to answer the inquiry from the reading means, to communicate with the reading means, and to enter a state of not answering another inquiry from the reading means after communicating with the reading means for a predetermined period; and calculating means for calculating calories of the one or more dishes or drinks using read data and displaying the calories.

12. A charging system for automatically calculating a charge for goods selected by a customer, comprising:

reading means for reading data in a non-contact state from at least two re-writable data carriers by repeating an inquiry, each of the re-writable data carriers being attached to a container of one or more items of goods selected by the customer, each of the re-writable data carriers entering a state of waiting a predetermined random period before answering the inquiry from the reading means, to answer the inquiry from the reading means, to communicate with the reading means, and to enter a state of not answering another inquiry from the reading means after communicating with the reading means for a predetermined period; and calculating means for calculating the charge for the one or more items of goods using read data and displaying the charge.

13. The charging system according to claim 12, wherein the one or more items of goods are arranged flatly so that directions of the attached re-writable data carriers are the same, and said reading means reads the data collectively from the re-writable data carriers of the one or more goods arranged flatly.

14. A computer-readable recording medium encoded with a program for controlling a computer, the program comprising:

inputting data to be used to calculate a charge for a dish or drink selected by a customer; and writing the data in at least two re-writable data carriers each of the re-writable data carriers being attached to a container of the dish or drink, each of the re-writable data carriers entering a state of waiting a predetermined random period before answering an inquiry from a reading means, to answer the inquiry from the reading means, to communicate with the reading means, and to enter a state of not answering another inquiry from the reading means after communicating with the reading means for a predetermined period.

15. A computer-readable recording medium encoded with a program for controlling a computer, the program comprising:

reading data in a non-contact state from at least two re-writable data carriers, each of the re-writable data carriers being attached to a container of one or more dishes or drinks selected by a customer, each of the re-writable data carriers entering a period of waiting a predetermined random period before answering an inquiry from a reading means, to answer the inquiry from the reading means, to communicate with the reading means, and to enter a state of not answering another inquiry from the reading means after communicating with the reading means for a predetermined period;

calculating a charge for the one or more dishes or drinks using the read data; and displaying the charge.

16. A charging method for automatically calculating a charge for a dish or drink selected by a customer, comprising:

writing data in at east two re-writable data carriers, each of the re-writable data carriers being attached to a container of a dish or drink;

reading data in a non-contact state from the data carriers of one or more dishes or drinks selected by the customer by repeating an inquiry, each of the re-writable data carriers entering a state of waiting a predetermined random period before answering the inquiry from a reading means, to answer the inquiry from the reading means, to communicate with the reading means, and to enter a state of not answering another inquiry from the reading means after communicating with a reading means for a predetermined period;

calculating said charge using read data; and displaying said charge.

17. A charging system for automatically calculating a charge for a dish or drink selected by a customer, comprising:

a writing unit writing data in at least two re-writable data carriers by repeating an inquiry, each of the re-writable data carriers being formed as part of a container of a dish or drink;

a reading unit reading data in a non-contact state from the re-writable data carriers, each of the re-writable data carriers entering a state of waiting a predetermined random period before answering the inquiry from the reading unit, to answer the inquiry from the reading unit, to communicate with the reading unit, and to enter a state of not answering another inquiry from the reading unit after communicating with the reading unit for a predetermined period; and a calculating unit calculating the charge using the read data and displaying the charge.

18. The charging system according to claim 17, wherein each of the selectively re-writable data carriers are adhered to the container of the dish or drink.

19. The charging system according to claim 17, wherein each of the selectively re-writable data carriers is embedded within the container of the dish or drink.

20. A container used in connection with reading means for reading data for automatic calculation of a charge of a dish or drink selected by a customer by repeating an inquiry, comprising:

tableware to hold the dish or drink; and at least two re-writable data carriers to record data to be used to calculate the charge, each of the re-writable data carriers being attached to a container of the dish or drink, and each of the re-writable data carriers entering a state of waiting a predetermined random period before answering the inquiry from the reading means, to answer the inquiry from the reading means, to communicate with the reading means, and to enter a state of not answering another inquiry from the reading means after communicating with the reading means for a predetermined period.

21. The container used in an automatic calculation of a charge of a dish or drink according to claim 20, wherein said re-writable data carrier further comprises:

an antenna;

a voltage generator circuit to provide power to said data carrier in response to electromotive force received from the antenna; and a memory unit to record the data to be used to calculate the charge.

22. The container used in an automatic calculation of a charge of a dish or drink according to claim 21, wherein said re-writable data carrier further comprises:

a modulator/demodulator to communicate modulated data between the antenna with the memory unit.

23. The container used in an automatic calculation of a charge of a dish or drink comprising:

an antenna;

a memory;

communication control logic to record data in at least two re-writable data carriers to be used to calculate the charge in said memory, each of the re-writable data carriers being attached to a container of the dish or the drink, and a voltage generator circuit to provide power to said memory and said communication control logic in response to electromotive force received from said antenna, each of the re-writable data carriers entering a state of waiting a predetermined random period before answering an inquiry from the communication control logic after communicating with the communication control logic.

24. The container used in an automatic calculation of a charge of a dish or drink according to claim 23, further comprising:

a modulator/demodulator to communicate modulated data between said antenna and said memory unit.

* * * * *

UNITED STATES PATENT AND TRADEMARK OFFICE
CERTIFICATE OF CORRECTION

PATENT NO. : 6,793,126 B2 Page 1 of 1
APPLICATION NO. : 09/021370
DATED : September 21, 2004
INVENTOR(S) : Ken Hashimoto It is certified that error appears in the above-identified patent and that said Letters Patent is hereby corrected as shown below:

Column 12, Line 34 after "carriers" insert --,--.

Column 12, Line 65 change "east" to --least--.

Signed and Sealed this

Seventh Day of November, 2006

JON W. DUDAS
*Director of the United States Patent and Trademark Office*